United States Patent Office 3,493,031
Patented Feb. 3, 1970

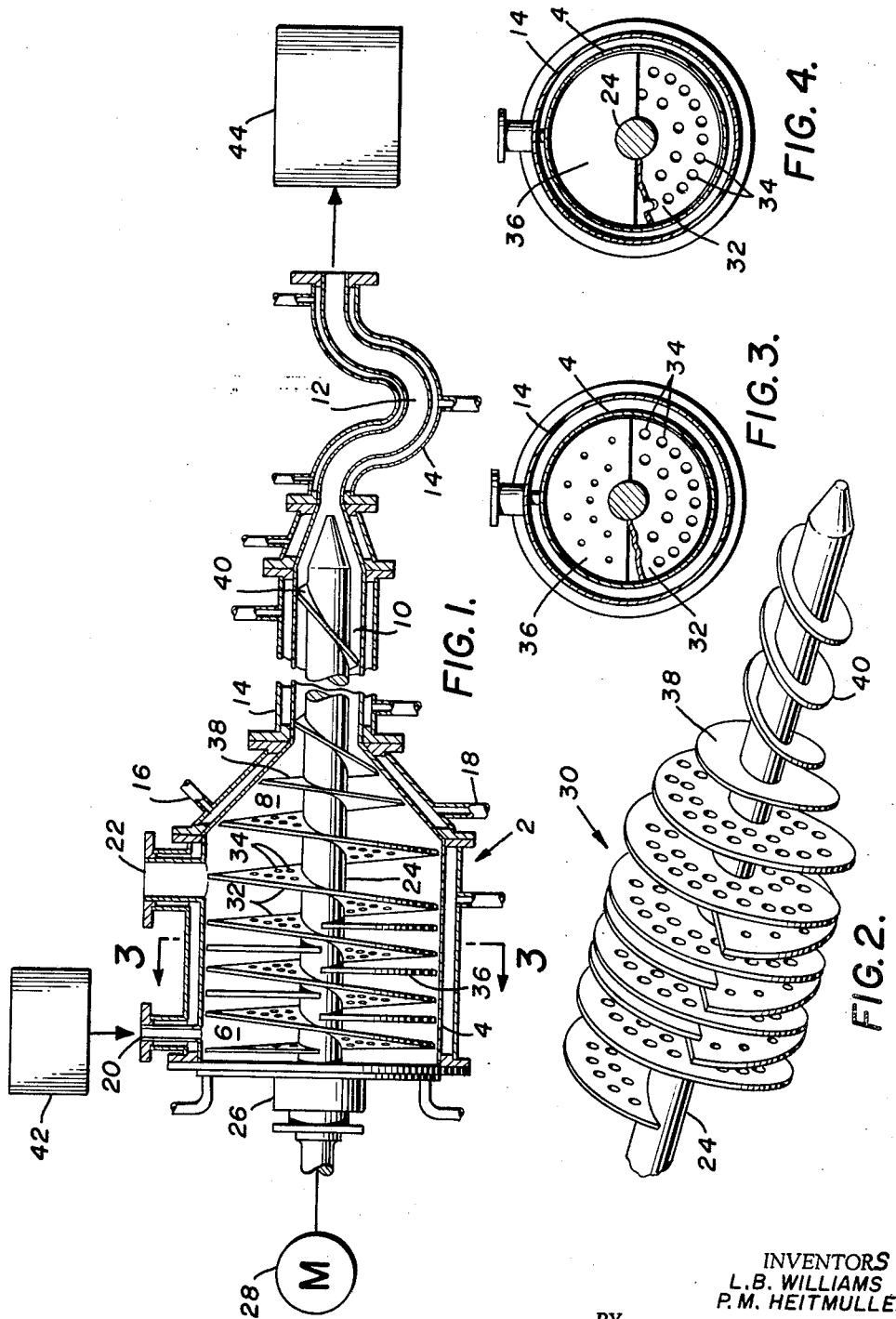

3,493,031
PREFINISHER FOR POLYMERIC MATERIAL
Louis B. Williams, Jr., and Paul M. Heitmuller, Pensacola, Fla., assignors to Monsanto Company, St. Louis, Mo., a corporation of Delaware
Filed Feb. 21, 1968, Ser. No. 707,256
Int. Cl. B01d 1/22, 1/28
U.S. Cl. 159—2    8 Claims

ABSTRACT OF THE DISCLOSURE

A horizontal prefinisher for separating and devolatilizing vapors and gaseous volatiles from a reactive mass, and for increasing the viscosity of the mass within a low range. Uninterrupted devolatilization, compaction, and pumping of the reactive mass is provided by a driven screw having a continuous spiral flight with transitional segments including a perforated and baffled conveyor segment, a tapered compacting segment and a straight pump segment. Devolatilization of gases is effected by surfacely conveying the reactive mass in a helical horizontal path, by surfacely wiping and filming the mass, and by fluctuating the rate of flow of the gases and the reactive mass through the devolatilization zone.

BACKGROUND OF THE INVENTION

The prefinisher is particularly adapted for processing fiber-forming polyamides and the description thereof will be given in this background by way of illustration. It will be understood that the prefinisher device functions, basically, as a devolatilizer to separate volatile vapors from viscous reactive masses and that the device may be used in the processing of other plastics, resins and linear condensation polymers.

In a continuous process, a polyamide such as nylon 6,6 is prepared by reacting adipic acid with an aqueous solution of hexamethylenediamine to form a nylon salt that is conveyed to an evaporating unit to expel water therefrom by the application of heat. From the evaporator the concentrated salt is delivered to a reactor or autoclave where the reaction mass is subjected to a controlled elevated temperature and is converted to a low molecular weight polymer. After sufficient holding time in the reactor, the partially polymerized reaction mass is delivered to a pressure reduction unit or flasher unit where water as steam is released from the reaction mass. The steam-laden mass is then delivered to a finisher unit where steam is vented and polymerization is completed to produce a high viscosity polymer.

The difficulties encountered in processing a reactive mass through a finisher are well known in the synthetic fiber producing industries. A conventional finisher unit comprises a heat jacketed vessel vented to atmosphere and having a screw conveyor for forwarding a reactive mass therethrough. Under operational conditions, conventional finishers are notorious for becoming steam burdened and gel clogged. Available finishers cannot cope with the excess steam liberated from the reactive mass in the flasher and delivered to the finisher. Adverse operating conditions are encountered when steam overburdens a finisher unit. The excess steam retards polymerization of the reaction mass and requires an increased holding time in processing the mass to a high viscosity polyamide. Extended holdup of polymer in a finisher contributes to its degradation. Degraded polymer or gel clings to the walls and surfaces of a finisher and in due time contaminates the reactive mass passing therethrough. As a result, operational longevity of finishers is brief and frequent maintenance and cleaning is required.

The pre-finisher provided is adapted to be interposed between flasher and finisher units, such as in the processing of polyamides, and functions primarily as a devolatilizer to remove substantially all of the steam from a reactive mass before delivery to the finisher. The prefinisher is inexpensive to manufacture, being simple and small in construction, and is designed for a rapid transport or throughput of a reactive mass. Use of a prefinisher results in more efficient and longer maintenance free finisher operation, faster finisher throughput rates and the production of higher viscosity and materials.

BRIEF SUMMARY OF THE INVENTION

The prefinisher comprises a longitudinal vessel defining in horizontal transition a large devolatilization, a tapered compaction, and a small diameter pump chamber. A supply inlet and a vapor outlet open into the large chamber, and the pump chamber has a discharge outlet.

Rotatably operable in close relation to the inner transitional wall surfaces defining the connected chambers and extending axially therethrough is a driven screw. The screw has a continuous helical flight with transitional flight segments for functionally effecting filming, devolatizing, conveying, compacting and pumping of a reaction mass delivered to the vessel. The screw flight extending through the devolatilizing chamber is a conveyor type of large depth and large blade area, and the turns of the flight are perforated. Baffles are carried on the screw shaft in staggered opposed relation between the turns of the perforated flight extending intermediate the supply inlet and vapor outlet. The large perforated flight develops into a decreasingly diminishing solid flight extending through the compaction chamber, and continues through the pumping chamber in the form of a short depth, pumping flight of uniform diameter.

A polymeric steam-laden mass is delivered to the devolatilizing chamber or zone and is surfacely conveyed by the perforated helical screw segment to the compacting chamber or zone. The screw flight is designed to maintain, at operational speeds, a very shallow level or pool of polymer in the devolatilizing chamber. The mass is squeezed, wiped between the vessel walls and outer edge of the perforated flight and baffles, and lifted out of the polymer pool in a thin film on the flight and baffles, effecting a release of steam. The steam passes restrictively through the perforations in the flight and is vented. Fluctuations in the rate of flow of the steam are provided by the baffles to prevent a rapid discharge of steam and to allow time for material to disengage therefrom. The baffles also provide a more uniform rate of flow of the mass in the bottom of the vessel by intermittently damping the flow.

The polymer mass is compacted by the tapered portion of the flight and is introduced into the pumping flight to be advanced or pumped out of the prefinisher.

BRIEF DESCRIPTION OF THE DRAWING

FIGURE 1 is a longitudinal cross-section view of the prefinisher with a schematic representation of associated units in a typical application.

FIGURE 2 is a perspective view of the prefinisher screw,

FIGURE 3 is a cross-section view taken through 3—3 of FIG. 1, and

FIGURE 4 is a cross-section view similar to FIG. 3 showing a modified embodiment.

DESCRIPTION OF A PREFERRED EMBODIMENT

Referring to the drawing, FIGS. 1–4, the prefinisher 2 comprises a cylindrical vessel 4 defining axially aligned transition chambers comprising, from left to right as viewed in the drawing, a large-diameter devolatilizing or degassing chamber 6 open to a tapered compacting chamber 8 in turn open to a small-diameter pumping chamber 10. A liquid seal, such as the U-shaped trap seal 12 illustrated, is connected to vessel 4 at the right end hereof.

Vessel 4 and seal 12 have an outer thermal jacket 14 defining a thermal chamber normally charged with Dowtherm vapor through a plurality of inlets 16 and drains 18. The devolatilizing, compacting, pumping, and seal portions of the vessel 4 may be separate thermal jackets to independently control the heating of each portion as many by desired. Any conventional means may be provided to heat the prefinisher 2.

A supply inlet port 20 opens into the top side of the devolatilizing chamber 6 at the upstream or left end thereof, and a vent port 22 opens therefrom at the downstream end thereof.

A screw shaft 24 extends centrally through the length of vessel 4. The shaft 24 extends through a bearing and seal housing 26 at the left end of vessel 4 and is driven by a motor 28. Preferably, the right or free end of shaft 24 and the portion of vessel 4 in adjacent surroundment thereof are tapered for design purposes.

Spiraling around the length of shaft 24 in a continuous left-hand turn is a helical screw flight 30 driven to forward material from left to right, as viewed in FIG. 1. The flight segment extending through the large chamber 6 is the devolatilizer flight segment 32. Flight segment 32 is of a conveyor design having a large radial surface with the depth thereof being, preferably, at least the root diameter of shaft 24 and the flight is perforated with holes or openings 34 extending transversely therethrough.

A plurality of transverse baffles 36 extend radially outwardly from and are arranged in staggered relation on opposite sides of and linearly along shaft 24, betwen the inlet and vent ports, 20 and 22, but not directly therebelow. Preferably, baffles 36 are perforated and substantially semi-circular as shown in FIG. 3; however, they may be of solid structure as shown in FIG. 4. The porosity of the baffles 36 when perforated should be more restrictive to the passage of gases therethrough then the perforated flight 32.

The outer diameter of the flight segment 32 and the baffles 36 is slightly smaller than the inner diameter of devolatilizing chamber 6 to provide close wall to flight spacing.

The flight segment extending through the tapered compaction chamber 8 is correspondingly the compaction flight segment 38. It is solid and tapers diminishing in outer diameter and in depth from the devolatilizing chamber 6 to the pumping chamber 10.

The flight segment extending through the pumping chamber 10 is the pumping flight 40. It is uniform and short in depth to provide a pumping action.

The compacting and pump flight segments, 38 and 40, have a closer spacing tolerance to the inner vessel wall than provided for the devolatilizing flight segment 32.

A prefinisher 2, as described, was connected between a flasher 42 and a finisher 44 unit in a process for producing a fiber-forming polyamide. The flasher 42 was connected to inlet 20 and the finisher 44 was connected to the end of trap 12.

Approximately 23 percent of the total area of the devolatilizer flight segment 32 was perforated with holes and the depth of the flight segment 32 was larger than the diameter of the screw shaft 24. Baffles 36 were perforated and semi-circular, with no baffles 36 provided directly below the openings 20 and 22. The total perforated area of each baffle was aproximately 12 percent of the total baffle area. The devolatilizer flight 32 and baffles 36 were spaced aproximately ⅛ inch away from the inner vessel wall, the tapered flight segment 38 was spaced approximately ¹⁄₁₆ inch from the inner vessel wall, and the pump flight segment 40 was spaced approximately ¹⁄₁₀₀ inch from the inner vessel wall.

In a typical operation, the screw was driven at approximately 25 r.p.m., and a reaction mass having a relative viscosity of 10 was delivered to the prefinisher 2 from the flasher 42 at a rate of 2400 pounds per hour. The reaction mass was pumped from the prefinisher 2 to the finisher 44 at a rate of 2200 pounds per hour, 200 pounds of vapor being vented to atmosphere from the prefinisher. The prefinisher 2 and trap 12 were maintained at a temperature of approximately 280° C. The reaction mass leaving the prefinisher had a relative viscosity of 25 and the holding time in the prefinisher was approximately 0.66 minute. The processing of the mass was continued in the finisher 44 and the polyamide produced had a relative viscosity of 65.

In passing through the prefinisher 2, the reaction mass laden with steam surfacely covers the perforated flight 32 and baffles 36, spills through the perforations, and is conveyed to the compacting segment 34. Preferably, the prefinisher 2 is operated to keep a low level of the mass, definitely below shaft 24. While the mass is wiped and thin filmed against the inner wall of vessel 4 and spirally moved through the devolatilizing chamber 6, steam is released from the mass and a degree of polymerization takes place. The gases in the form of steam pass restrictedly at one rate through the perforations in the flight and are restricted to a further degree in passing through the flight and are restricted to a further degree in passing through baffles 36 so that a fluctuating gas flow toward the vent 22 is provided.

The mass in the bottom of the vessel 4 is forwarded by the flight 32 toward the compaction zone 8. The baffles 36 act to even out the flow. No baffles are provided near the compaction flight 38 since it is desirable to have the mass build up at this point to be readily conveyed by the flight 38. Baffles 32 are not provided below the inlet 20 or vent port 22 since it is desirable not to impede the ingress of the mass to or the egress of steam from the prefinisher 2.

The use of a prefinisher 2 reduced the dwell time required to bring the reactive mass to a desired relative viscosity in the finisher 44, permitted the use of more uniform and less elevated temperatures in the finisher 44, increased the operational performance time before shutdown of the finisher 44, and permitted the production of higher tenacity yarns from the polyamides produced.

The use of a prefinisher permits the finisher to operate at a faster polymer throughput rate and under less burdened conditions due to the higher viscosity polymer introduced thereto. Passage of the polymer from the prefinisher to the finisher is at a controlled rate with no spurts and belches characteristic of conventional processing. The holdup time in a finisher is based on obtaining the maximum separation of vapor from the polymer to attain high viscosity products. By providing a separate vented prefinnisher with a positive seal between the flasher and finisher units, as in a polyamide process, the only vapor introduced into the finisher is that still entrained in the polymer. Polymer is conveyed to the finisher in a smooth laminar flow without splashing and spraying.

It will be understood that variations and modifications of the prefinisher and method illustrated and described are expected to be covered within the purview of the invention and that limitations are only contemplated within the scope of the following claims.

We claim:
1. A prefinisher comprising,
   a vessel defining in horizontal alignment a large diameter devolatilizing chamber, a tapered compacting chamber and a small diameter pumping chamber means defining a feed supply inlet, an auxiliary in continuous transition and axial alignment,
   said large diameter devolatilizing chamber having means defining a feed supply inlet, an auxiliary spaced gas-vapor vent downstream of the feed inlet and a process material discharge outlet leading to said compacting chamber, the latter leading in turn to said pumping chamber, a helical screw extending axially the length of said vessel and being rotatably operable therein close to the vessel wall, said helical screw provided with a transitional screw flight having a large diameter, deep radial perforated blade devolatilizing segment operable within said devolatilizing chamber; an imperforate tapered helical segment operable within said compacting chamber; and a small diameter pump segment operable in said pumping chamber, transverse baffle means provided on said helical screw between the turns of said screw flight of said volatilizing segment thereof.

2. A prefinisher as in claim 1, wherein said vessel has a concentrically arranged outer thermal jacket.

3. A prefinisher as in claim 1, wherein said baffle means are perforated.

4. A prefinisher as in claim 1, wherein said baffle means are solid.

5. A prefinisher as in claim 1, wherein said baffle means are semi-circular and perforated, extend close to the wall of said vessel, and are provided in opposed staggered relation intermediate the turns of the devolatilizer flight segment between said supply inlet and vent outlet.

6. A prefinisher as in claim 1, having a U-shaped liquid-trap seal connected to and open at one end thereof to the pump outlet.

7. A prefinisher as in claim 1, wherein said helical screw is journaled at one end thereof and extends free and unsupported through said vessel.

8. A prefinisher comprising, a vessel defining in horizontal alignment a large diameter devolatilizing chamber, a tapered compacting chamber and a small diameter pumping chamber in continuous transition and axial alignment, said large diameter devolatilizing chamber having means defining a feed supply inlet, an auxiliary spaced gas-vapor vent downstream of the feed inlet and a process material discharge outlet leading to said compacting chamber, the latter leading in turn to said pumping chamber, a helical screw extending axially the length of said vessel and being rotatably operable therein close to the vessel wall, said helical screw provided with a transitional screw flight having a large diameter, deep radial perforated blade devolatilizing segment operable within said devolatilizing chamber; a tapered helical segment operable within said compacting chamber and a small diameter pump segment operable in said pumping chamber, transverse baffle means provided on said helical screw between the turns of said screw flight of said devolatilizing segment thereof.

References Cited

UNITED STATES PATENTS

| | | |
|---|---|---|
| 2,378,539 | 6/1945 | Dawihl. |
| 2,626,856 | 1/1953 | Alles. |
| 3,253,892 | 5/1966 | Brignac et al. _____ 23—28 |
| 2,833,750 | 5/1958 | Vickers _____ 260—85. |
| 3,067,812 | 12/1962 | Latinen et al. _____ 159— |
| 3,361,537 | 1/1968 | Ferrante _____ 23—28 |

NORMAN YUDKOFF, Primary Examiner

J. SOFER, Assistant Examiner

U.S. Cl. X.R.

18—12; 159—13; 260—78

UNITED STATES PATENT OFFICE
CERTIFICATE OF CORRECTION

Patent No. 3,493,031      Dated February 3, 1970

Inventor(s) L. B. Williams and P. M. Heitmuller

It is certified that error appears in the above-identified patent and that said Letters Patent are hereby corrected as shown below:

Column 2, line 11, "and" should read -- end --. Column 3, line 11, "be" should read -- have --; line 12, "many" should read -- may --; line 13, "by" should read -- be --; line 36, "betwen" should read -- between --. Column 4, line 58, "prefinnisher" should read -- prefinisher --; line 73, "means defining a feed supply inlet, an auxiliary" should be deleted in its entirety.

SIGNED AND SEALED

JUL 14 1970

(SEAL)
Attest:

Edward M. Fletcher, Jr.
Attesting Officer

WILLIAM E. SCHUYLER, JR.
Commissioner of Patents